US009584035B2

(12) United States Patent
Choi (10) Patent No.: US 9,584,035 B2
(45) Date of Patent: Feb. 28, 2017

(54) DUAL-EDGE TRACKING SYNCHRONOUS RECTIFIER CONTROL TECHNIQUES FOR A RESONANT CONVERTER

(71) Applicant: Fairchild Semiconductor Corporation, San Jose, CA (US)

(72) Inventor: Hangseok Choi, Bedford, NH (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 185 days.

(21) Appl. No.: 14/524,423

(22) Filed: Oct. 27, 2014

(65) Prior Publication Data

US 2015/0131336 A1 May 14, 2015

Related U.S. Application Data

(60) Provisional application No. 61/902,961, filed on Nov. 12, 2013.

(51) Int. Cl.
*H02M 3/335* (2006.01)
*H02M 1/00* (2006.01)
(Continued)

(52) U.S. Cl.
CPC ..... *H02M 3/33592* (2013.01); *H02M 3/3353* (2013.01); *H02M 2001/0058* (2013.01);
(Continued)

(58) Field of Classification Search
CPC .... H02M 1/083; H02M 1/088; H02M 1/4241; H02M 3/33507; H02M 3/33515;
(Continued)

(56) References Cited

U.S. PATENT DOCUMENTS

6,418,039 B2  7/2002  Lentini et al.
8,023,289 B2  9/2011  Yang et al.
(Continued)

*Primary Examiner* — Adolf Berhane
*Assistant Examiner* — Gary Nash
(74) *Attorney, Agent, or Firm* — Grossman Tucker Perreault & Pfleger PLLC (57) ABSTRACT

This disclosure provides control techniques for a resonant converter. In one control technique, for switching speeds that are below the resonant frequency of the primary stage of the converter, the switches of the synchronous rectifier (SR) portion (SR switches) of the resonant converter are controlled based on a rising edge of the corresponding primary side switch and the turn off time of a corresponding SR switch. In general, for below resonance operation, each corresponding SR switch will be turned off prior to the falling edge of each corresponding primary side switch, while each corresponding SR switch will be turned on at the rising edge of the each corresponding primary side switch. The conduction time of respective SR switches is generally constant for below resonance operation. In another control technique, for switching speeds that are above the resonant frequency of the primary stage of the converter, the SR switches are controlled based on the falling and rising edges of the voltage across the each corresponding SR switch. In general, for above resonance operation, each corresponding SR switch will be turned off after the falling edge of each corresponding primary side switch, while each corresponding SR switch will be turned on after the rising edge of the each corresponding primary side switch.

14 Claims, 5 Drawing Sheets

(51) Int. Cl.
*H02M 5/42* (2006.01)
*H02M 7/04* (2006.01)
*H02M 7/68* (2006.01)
*H02M 3/24* (2006.01)
*H02M 7/44* (2006.01)

(52) U.S. Cl.
CPC ....... *Y02B 70/1433* (2013.01); *Y02B 70/1475* (2013.01); *Y02B 70/1491* (2013.01)

(58) Field of Classification Search
CPC ......... H02M 3/33523; H02M 3/33576; H02M 3/33592
USPC .................... 363/21.01–21.03, 78, 89, 97, 98
See application file for complete search history.

(56) References Cited

U.S. PATENT DOCUMENTS

| | | | |
|---|---|---|---|
| 8,576,587 B2 | 11/2013 | Hsu | |
| 2008/0055942 A1* | 3/2008 | Tao | H02M 3/33592 363/21.03 |
| 2009/0175056 A1* | 7/2009 | Choi | H02M 3/33569 363/21.06 |
| 2009/0251925 A1* | 10/2009 | Usui | H02M 3/33561 363/16 |
| 2010/0172157 A1* | 7/2010 | Chen | H02M 3/33592 363/21.02 |
| 2011/0150521 A1* | 6/2011 | Uchiyama | G03G 15/80 399/88 |
| 2011/0211370 A1* | 9/2011 | Luo | H02M 3/33592 363/21.02 |

\* cited by examiner

DUAL-EDGE TRACKING SYNCHRONOUS RECTIFIER CONTROL TECHNIQUES FOR A RESONANT CONVERTER

PRIORITY

The present U.S. Non-Provisional Patent Application claims priority to U.S. Provisional Patent Application No. 61/902,961 entitled "Dual-Edge Tracking Synchronous Rectifier Control Techniques for a Resonant Converter" that was filed on Nov. 12, 2013. The entire contents of the above-identified U.S. Provisional Patent Application is incorporated by reference herein.

FIELD

The present disclosure relates to a DC/DC converter system, and more particularly, to synchronous rectifier control techniques for a resonant converter.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides control techniques for a resonant converter. In one control technique, for switching speeds that are below the resonant frequency of the primary stage of the converter, the switches of the synchronous rectifier (SR) portion (SR switches) of the resonant converter are controlled based on a rising edge of the corresponding primary side switch and the turn off time of a corresponding SR switch. In general, for below resonance operation, each corresponding SR switch will be turned off prior to the falling edge of each corresponding primary side switch, while each corresponding SR switch will be turned on at the rising edge of the each corresponding primary side switch. The conduction time of respective SR switches is generally constant for below resonance operation. In another control technique, for switching speeds that are above the resonant frequency of the primary stage of the converter, the SR switches are controlled based on the falling and rising edges of the voltage across the each corresponding SR switch. In general, for above resonance operation, each corresponding SR switch will be turned off after the falling edge of each corresponding primary side switch, while each corresponding SR switch will be turned on after the rising edge of the each corresponding primary side switch. The conduction time of respective SR switches may be variable for above resonance operation. In this manner, predictive drive control signals may be generated for the SR switches to prevent early or late turn off times of the SR switches when the switching frequency of the primary side changes rapidly. Thus, these control techniques reduce or eliminate negative currents at the SR switches, which can cause severe switching noise leading to the failure of the control circuit and significantly impact overall output stability.

Figure 1:
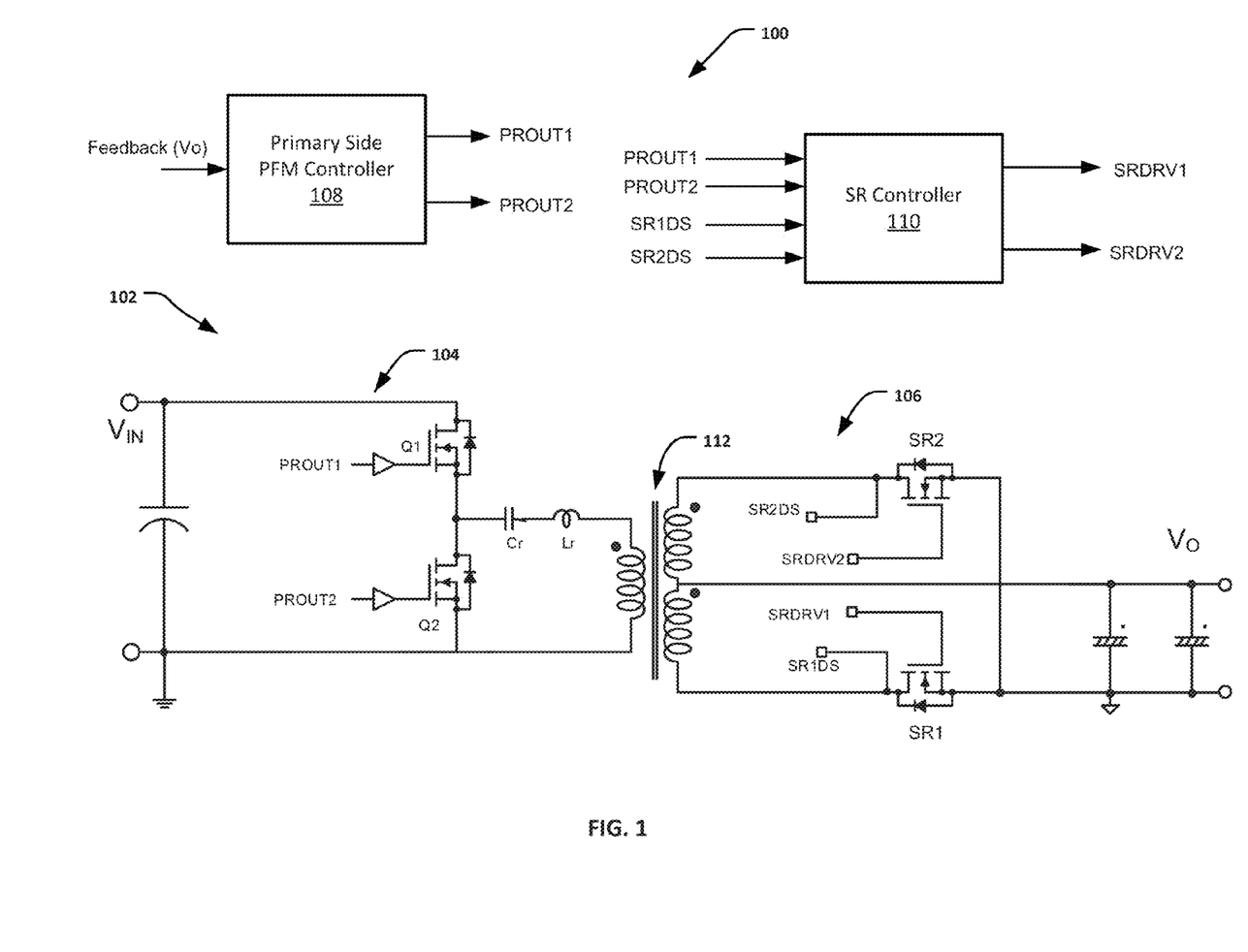
FIG. 1 illustrates a resonant converter system consistent with various embodiments of the present disclosure.

FIG. 1 illustrates a resonant converter system 100 consistent with various embodiments of the present disclosure. The converter system 100 of FIG. 1 includes converter circuitry 102 that includes a primary side stage 104 that includes inverter circuitry and a secondary side stage 106 that includes synchronous rectifier circuitry. The system 100 also includes a pulse frequency modulation (PFM) controller 108 to control the operation of the inverter switches Q1 and Q2 of the primary side 104, and a resonance-based SR controller 110 to control the operation of the SR switches SR1 and SR2 of the secondary side 106. The system 100 generally operates as a DC/DC resonant converter circuit that receives an input DC voltage (VIN) and generates an output DC voltage (Vo). The inverter circuitry of the primary side 104, in one embodiment, includes two switches Q1 and Q2 arranged in a half bridge configuration. The conduction state of the switches Q1 and Q2 are controlled by drive signals PROURT1 and PROUT2, respectively, of the controller 108. The drive signals PROUT1 and PROUT2 may be generated in a well-known manner for PFM operation of a half bridge circuit, and the drive signals may be based on, at least in part, feedback information from the output Vo. The primary side 104 includes a resonant tank circuit that includes a transformer 112, resonant capacitor Cr and resonant inductor Lr. The resonant tank circuit operates to generate a sinusoidal waveform from the square wave produced by the switches Q1 and Q2. The resonant frequency (f0) of the system 100 is generally controlled by the resonant capacitor Cr and resonant inductor Lr. Generally, the gain of the DC/DC converter system 100 may be controlled by the switching frequency (fs) of the switches Q1 and Q2 in relation to the resonant frequency (f0). In some embodiments, the gain of the system 100 is larger when fs<f0 and smaller when fs>f0. Of course, in other embodiments the inverter circuitry may include, for example, a full bridge inverter topology, a push-pull inverter topology, Class C inverter topology, etc., and/or other well-known or after developed power supply topologies. In still other embodiments, the control of the switches Q1 and Q2 may include, for example, pulse width modulation (PWM) techniques, and/or other well-known or after developed power supply control techniques, etc.

The synchronous rectifier circuitry of the secondary side stage 106 includes rectifier switches SR1 and SR2 electrically coupled to the secondary side of the transformer 112 and configured to operate as a full wave rectifier of the sinusoidal signal at the secondary side of the transformer 112. The SR switches may include MOSFET devices that include body diodes biased in a source to drain direction (as shown). The conduction state of switch SR1 is controlled by the gate control signal SRDRV1 and the conduction state of the switch SR2 is controlled by the gate control signal SRDRV2. An SR controller 110 is configured to generate gate control signals SRDRV1 and SRDRV2 to control the conduction of SR1 and SR2, respectively, based on, at least in part, the primary side switch control signals PROUT1 and PROUT2 and the drain-source voltage of the SR switches, labeled as SR1DS and SR2DS. The controller 110 is configured to generate the control signals SRDRV1 and SRDRV2 so that the body diode conduction time is minimized and so that negative current across the SR switches is reduced or eliminated, as described below.

Figure 2:
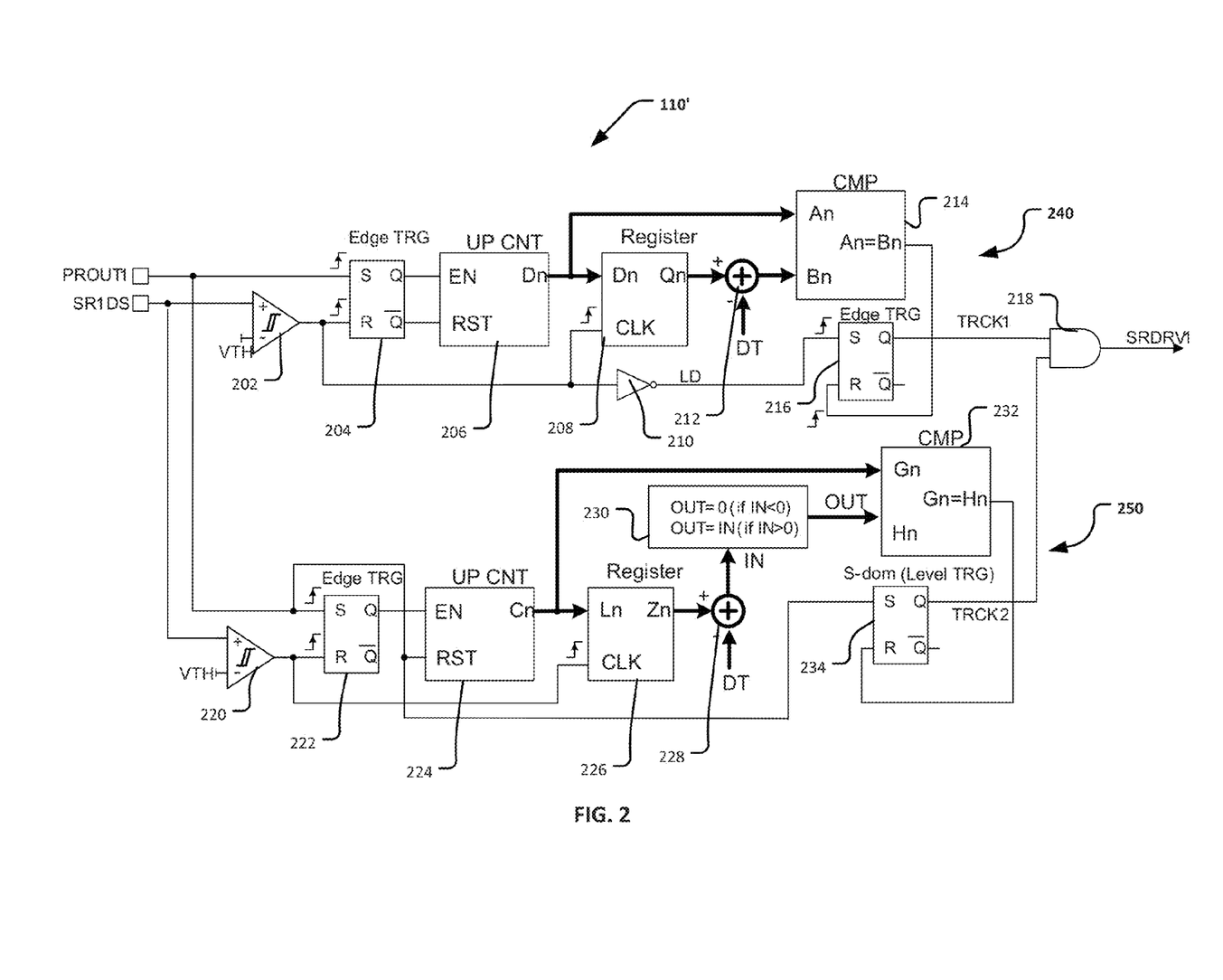
FIG. 2 illustrates an example resonance-based control circuitry consistent with one embodiment of the present disclosure.

FIG. 2 illustrates an example SR controller 110' consistent with one embodiment of the present disclosure. In this example, the controller 110' is for generating the SRDRV1 control signal to control the conduction state of the SR1 switch based on the primary side gate control signal PROUT1 and the drain-source voltage of the SR1 switch (SR1DS). It should be understood at the outset that the circuitry 110' may be substantially duplicated to generate the SRDRV2 control signal to control the conduction state of the SR2 switch based on the primary side gate control signal PROUT2 and the drain-source voltage of the SR2 switch (SR2DS).

Controller 110' generally includes first tracking circuitry 240 configured to generate a first tracking signal TRCK1. The TRCK1 signal is indicative of a time duration from a rising edge of the PROUT1 signal to the turn off time of the corresponding SR1 switch. This information is used to determine the turn off time of the SR1 switch in the subsequent switching cycle. The controller 110' also includes second tracking circuitry 250 configured to generate a second tracking signal TRCK2. The TRCK2 signal is indicative of a time duration from the falling edge of the PROUT1 signal to turn off time of the corresponding SR1 switch. This information is used to determine the turn off time of the SR1 switch in the subsequent switching cycle. The TRCK1 and TRCK2 signals are ANDed at 218 to generate a gate control signal SRDRV1 to control the conduction state of the SR1 switch.

The first tracking circuitry 240 includes first comparator circuitry 202 configured to compare SR1DS with a threshold voltage VTH. The first comparator circuitry 202 may include hysteresis to prevent the comparator from changing states from small fluctuations of the SR1DS voltage, reduction of noise influence, etc. The threshold voltage VTH may be selected so that the first comparator 202 accurately generates an output change when the SR1DS voltage changes states. The first tracking circuitry 240 also includes first edge-triggered flip-flop circuitry 204 configured to generate first and second flip-flop output signals, Q and Q' (complimentary outputs), based on the gate control signal PROUT1 and the output of the first comparator circuitry 202. The Q signal is HIGH when the output of comparator 202 is LOW (e.g., when SR1DS is below VTH) and when the PROUT1 signal is HIGH, where Q is triggered HIGH at the rising edge of PROUT1. The Q' is HIGH when the output of comparator 202 is HIGH (when SR1DS is above VTH). First up-counter circuitry 206 is configured to generate a running time count of the Q signal when the Q signal is HIGH. The running count, represented as Dn in FIG. 2, provides a time duration count of how long Q is HIGH in the current cycle of the primary side switches. The first up-counter circuitry 206 is configured to start the count at the rising edge of the Q signal and terminate the count at the rising edge of the Q' signal (which operates to reset the up-counter circuitry 206). The running count signal Dn represents the time duration of the Q signal from flip-flop 204 for the current cycle of the PROUT1 signal.

The first tracking circuitry 240 also includes first register circuitry 208 configured to store the running count signal Dn as Qn. The register 208 stores the value of Qn at the rising edge of the output of comparator 202. Subtractor circuitry 212 is included and configured to subtract a predetermined time period, DT, from Qn. The output of subtractor 212 is labeled Bn in FIG. 2. The value of DT may be selected, for example, so that the on times of the SR switches do not overlap. Second comparator (digital comparator) circuitry 214 is configured to compare Dn (labeled An at the second comparator 214) and Bn. An represents the current cycle (n+1) of the PROUT1 signal and Bn represents the previous cycle (n) of the PROUT1 signal. If An=Bn, the output of 214 goes HIGH, otherwise the output of 214 remains LOW. The first tracking circuitry 240 also includes second edge-triggered flip-flop circuitry 216 that is configured to generate first and second flip-flop output signals, Q and Q' (complimentary outputs), based on the inverted output of the first comparator circuitry 202 (via inverter circuitry 210) and the output of the second comparator circuitry 214. The Q output of 216 goes HIGH at the rising edge of LD signal and remains HIGH while An does not equal Bn (when An=Bn, the flip-flop 216 is reset and the Q output is LOW). The Q output of flip-flop circuitry is labeled TRCK1 in FIG. 2.

The second tracking circuitry 250 includes third comparator circuitry 220 configured to compare SR1DS with the threshold voltage VTH. The third comparator circuitry 220 may include hysteresis to prevent the comparator from changing states from small fluctuations of the SR1DS voltage, reduction of noise influence, etc. The second tracking circuitry 250 also includes third edge-triggered flip-flop circuitry 222 configured to generate first and second flip-flop output signals, Q and Q' (complimentary outputs), based on the gate control signal PROUT1 and the output of the third comparator circuitry 220. The Q signal of 222 becomes HIGH at the rising edge of PROUT1 signal and remains HIGH until the output of comparator 220 is HIGH (when SR1DS is above VTH). Second up-counter circuitry 224 is configured to generate a running time count of the Q signal when the Q signal is HIGH while PROUT1 signal is LOW (While PROUT1 is HIGH the counter is not running since it is reset). The running count, represented as Cn in FIG. 2, provides a time duration count of how long Q of circuitry 222 is HIGH while PROUT1 is LOW in the current cycle of the primary side switches. The second up-counter circuitry 224 is configured to start the count at the falling edge of the PROUT1 signal and terminate the count at the falling edge of the Q signal (which operates to disable the up-counter circuitry 224). The running count signal Cn represents the time duration of the Q signal while PROUT1 is LOW from flip-flop 222 for the current cycle of the PROUT1 signal.

The second tracking circuitry 250 also includes second register circuitry 226 configured to store the running count signal Ln as Zn. The register 226 stores Zn at the rising edge of the output of comparator 222. Second subtractor circuitry 228 is included and configured to subtract the predetermined time period, DT, from Zn. The output of subtractor 228 is labeled IN in FIG. 2. To account for a negative output from the subtractor 228, logic circuitry 230 is included that determines if IN is positive or negative. When the resonant converter operates below resonance, RST of 224 is HIGH while EN of 224 is HIGH. This results in zero output in Cn, Ln and Zn signals, which eventually leads to negative output from the subtractor 228. If IN is positive, logic circuitry 230 outputs IN, but if IN is negative, logic circuitry 230 outputs a zero value. Fourth comparator (digital comparator) circuitry 232 is configured to compare Cn (labeled Gn at the fourth comparator 232) and the output of logic circuitry 230 (labeled as Hn). Gn represents the current cycle (n+1) time duration from the falling edge of PROUT1 signal and Hn represents the previous cycle (n) time duration from the falling edge of the PROUT1 signal to the rising edge of SR1DS signal minus the dead time DT. If Gn=Hn, the output of 232 goes high, otherwise the output of 232 remains low. The second tracking circuitry 250 also includes fourth level triggered flip-flop circuitry 234 that is configured to generate first and second flip-flop output signals, Q and Q' (complimentary outputs), based on the output of the third comparator circuitry 220, and the output of the fourth comparator circuitry 232. The Q output of 234 becomes HIGH at the rising edge of PROUT1 and remains HIGH. The Q becomes LOW when HIGH R (reset) is applied while S is LOW. When Gn=Hn, the flip-flop 234 is reset and the Q output is LOW. It should be noted that the level triggered flip-flop 234 is Set dominant. Thus Q stays HIGH as long as S is HIGH regardless of a reset signal from comparator 232. The Q output of flip-flop circuitry 234 is labeled TRCK2 in FIG. 2.

Control circuitry 110' also includes AND gate circuitry 218 configured to AND the TRCK1 and TRCK2 signals to generate the gate drive signal SRDRV1 for the SR1 switch. Operation of the controller circuitry 110' is described in detail below.

Below Resonance Operation

Figure 3:
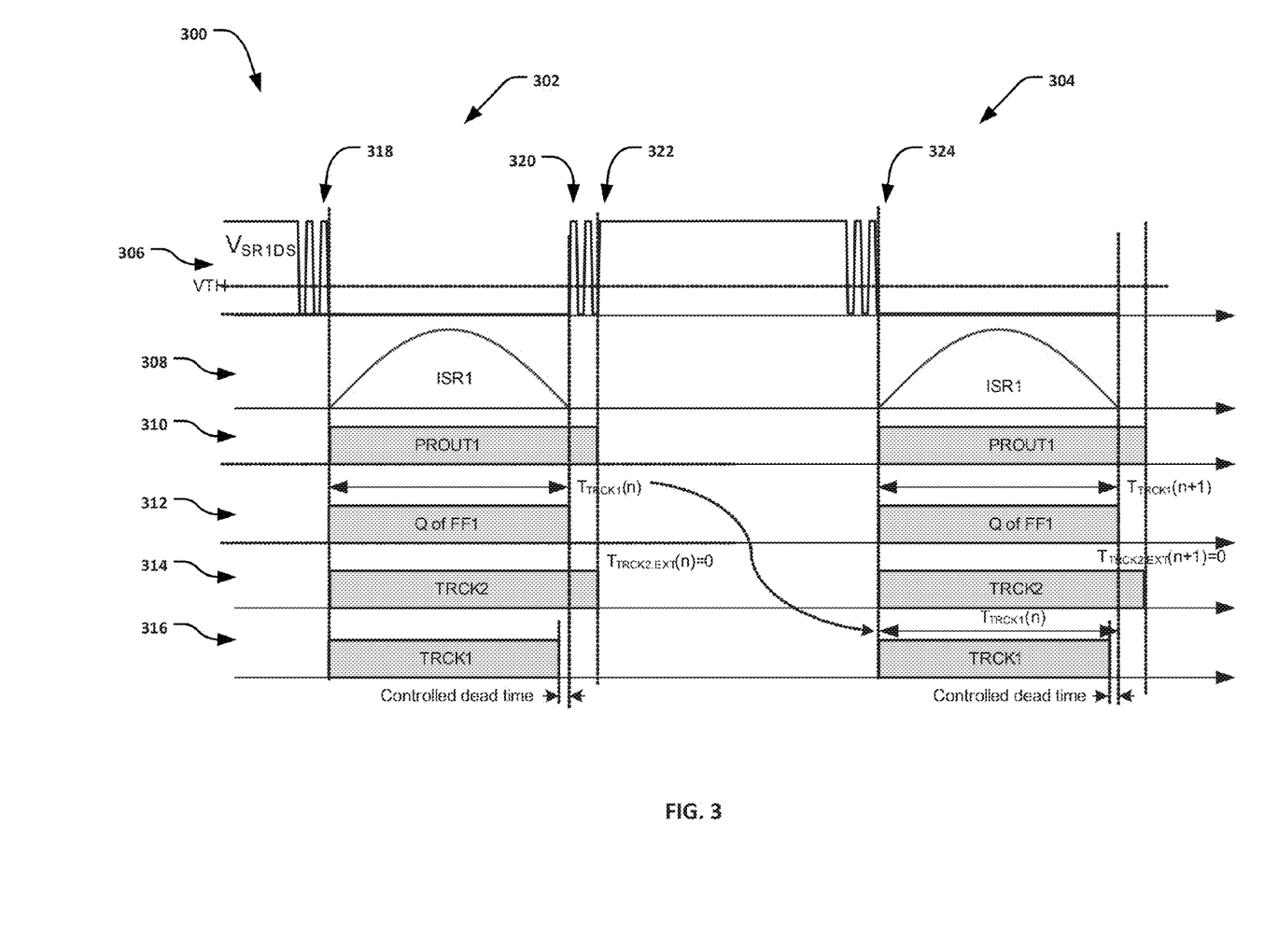
FIG. 3 illustrates an example timing diagram of various signals for below resonance operation of consistent with one embodiment of the present disclosure.

FIG. 3 illustrates an example timing diagram 300 of various signals for below resonance operation of consistent with one embodiment of the present disclosure. With continued reference to FIGS. 1 and 2, the timing diagram 300 illustrates various signal waveforms through a first cycle period 302 (nth cycle) and a subsequent cycle period 304 (n+1 cycle) of the PROUT 1 signal. While the timing diagram 300 represents the signal states of various signals associated with the operation of the Q1 and SR1 switches, it should be understood at the outset that the timing diagram 300 may apply equally to the operation of the Q2 and SR2 switches.

Waveform 306 illustrates the drain-source voltage (VSR1DS) of the SR1 switch and the reference threshold signal VTH. Waveform 308 illustrates the current through the SR1 switch. Waveform 310 illustrates the PROUT1 gate drive signal for the Q1 switch of the primary side. Waveform 312 illustrates the Q signal of the first flip-flop circuitry 204. Waveforms 314 and 316 illustrate the TRACK2 and TRCK1 signals, respectively.

In operation, when the PROUT1 signal transitions from low to high (rising edge), thus turning Q1 on, the body diode of the SR1 switch conducts and the voltage drop across the SR1 switch approach zero Volts, as depicted in the VSR1DS waveform 306 at timing interval 318. At timing interval 318, the Q signal 312, TRCK2 signal 314 and TRCK1 signal 316 also transition from low to high. Once the TRCK1 and TRCK2 signals are both high, the SRDRV1 signal is high to turn on the SR1 switch. The on time for the Q signal is stored and utilized in the subsequent cycle period 304. If the SR gate is properly controlled such that it is turned off slightly before (as much as the dead time of SR gate drive) the SR current reaches zero, the SR MOSFET body diode conducts during the dead time. Then, the SR body diode naturally turns off when the current through the SR1 switch approaches zero (zero crossing) and the VSR1DS voltage goes high, as illustrated at timing interval 320 and waveforms 306 and 308. In below resonance operation, the Q signal transitions from high to low at the zero crossing interval 320, and the TRCK1 signal is adjusted using the DT timing adjustment value. The PROUT signal 310 and TRCK2 signal transition from high to low at time interval 322, which is after time interval 320. Thus, and because of the operation of AND gate circuitry 218, the SR1 gate drive control signal, SRDRV1, is high (and thus the SR1 switch is on) for a time period that is less than the Q signal 312 of the previous switching cycle and less than the gate drive signal PROUT1 of previous switching cycle. In addition, the SRDRV1 gate control signal transitions from high to low (thus turning off SR1) before the high to low transition of the PROUT1 signal 310. The time period for the TRCK1 signal generally remains constant during below resonance operation. These operations repeat for the subsequent time period 304, starting at time interval 324.

Above Resonance Operation

Figure 4:
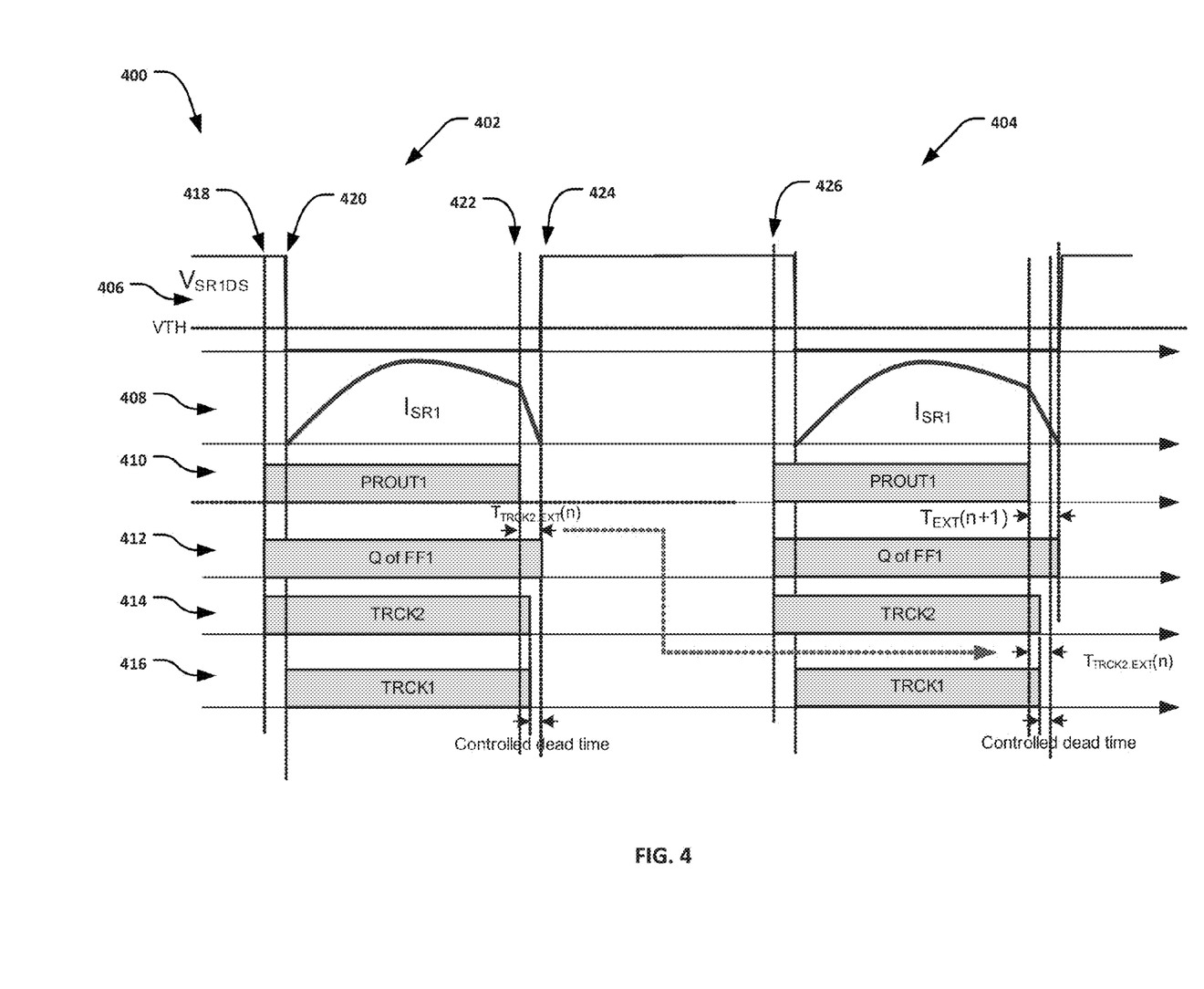
FIG. 4 illustrates an example timing diagram of various signals for above resonance operation of consistent with one embodiment of the present disclosure.

FIG. 4 illustrates an example timing diagram 400 of various signals for above resonance operation of consistent with one embodiment of the present disclosure. With continued reference to FIGS. 1 and 2, the timing diagram 400 illustrates various signal waveforms through a first cycle period 402 (nth cycle) and a subsequent cycle period 404 (n+1 cycle) of the PROUT1 signal. While the timing diagram 400 represents the signal states of various signals associated with the operation of the Q1 and SR1 switches, it should be understood at the outset that the timing diagram 400 may apply equally to the operation of the Q2 and SR2 switches.

Waveform 406 illustrates the drain-source voltage (VSR1DS) of the SR1 switch and the reference threshold signal VTH. Waveform 408 illustrates the current through the SR1 switch. Waveform 410 illustrates the PROUT1 gate drive signal for the Q1 switch of the primary side. Waveform 412 illustrates the Q signal of the first flip-flop circuitry 204. Waveforms 414 and 416 illustrate the TRACK2 and TRCK1 signals, respectively.

In operation, when the PROUT1 signal transitions from low to high (rising edge), thus turning Q1 on, the body diode of the SR1 switch conducts after some amount of delay time (from time interval 418 to time interval 420) since resonance current is lagging the driving voltage in above resonance operation, as depicted in the VSR1DS waveform 406 at timing interval 418. At timing interval 418, the Q signal 412 and TRCK2 signal 414 also transition from low to high. However, since the Q1 switch is switching above the resonant frequency, and the voltage drop across the SR1 switch approach zero Volts at time interval 420 and the current through the SR1 switch 408 begins to rise. At timing interval 420, the TRCK1 signal 416 transitions from low to high. Once the TRCK1 and TRCK2 signals are both high, the SRDRV1 signal is high to turn on the SR1 switch. The on time for the Q signal is stored and utilized in the subsequent cycle period 404. When the PROUT1 signal transitions from high to low at timing interval 422, the current through the SR1 switch 408 is forced to quickly drop to zero through time interval 424 since the reversed input voltage is applied across the resonant network after PROUT1 signal becomes low forcing PROUT2 to go HIGH. If the SR gate is properly controlled such that it is turned off slightly before (as much as the dead time of SR gate drive) the SR current reaches zero, the SR MOSFET body diode conducts during the dead time. Then, the SR body diode naturally turns off when SR current approaches zero (zero crossing) and the VSR1DS voltage goes high, as illustrated at timing interval 424 and waveforms 406 and 408.

The Q signal is still high after PROUT1 goes low because the first flip flop 204 is edge triggered (although the signal level (high/low) will not matter in this case). The fourth flip flop 234 is a general level triggered flip-flop with Set dominant. Thus the TRACK2 signal is always HIGH as long as PROUT1 is HIGH. The basic assumption of all the circuit operation is that the SR current zero crossing is properly predicted and the SR gate is turned off slightly before the SR current zero crossing (as much as the dead time). Then, the SR MOSFET body diode conducts during the dead time and turns off naturally when the current reaches zero. Here you have to understand the difference between SR conduction time and SR gate ON time. Since the current is flowing from the source to the drain, SR gate drive signal does not interrupt the current. It just reduces the voltage drop of SR MOSFET. For above resonance SR1DS transition from low to high after high to low transition of PROUT1. In above resonance operation, the Q signal 412 transitions from high to low at the zero crossing interval 424, and the TRCK2 signal is adjusted using the DT timing adjustment value.

As long as the resonant converter operates in steady state and the switching frequency is fixed, the TRCK1 signal and TRCK2 signal end at the same time. However, the TRCK1 signal anticipates the SR current zero crossing instant by measuring the time from the rising edge of PROUT1 signal to the SR current zero crossing. Thus, it does not respond to the switching frequency variation of the current switching cycle. However, the TRCK2 signal anticipates the SR current zero crossing instant by measuring the time from the falling edge of PROUT1 signal to the SR current zero crossing. Thus, it does respond to the switching frequency variation of the current switching cycle (Note that the time reference for TRACK1 is the falling edge of PROUT1 that has the switching frequency information). The time period for the TRCK2 signal for above resonance operation is generally less than the time period of the TRCK2 signal for below resonance operation. These operations repeat for the subsequent time period 404, starting at time interval 426.

Figure 5:
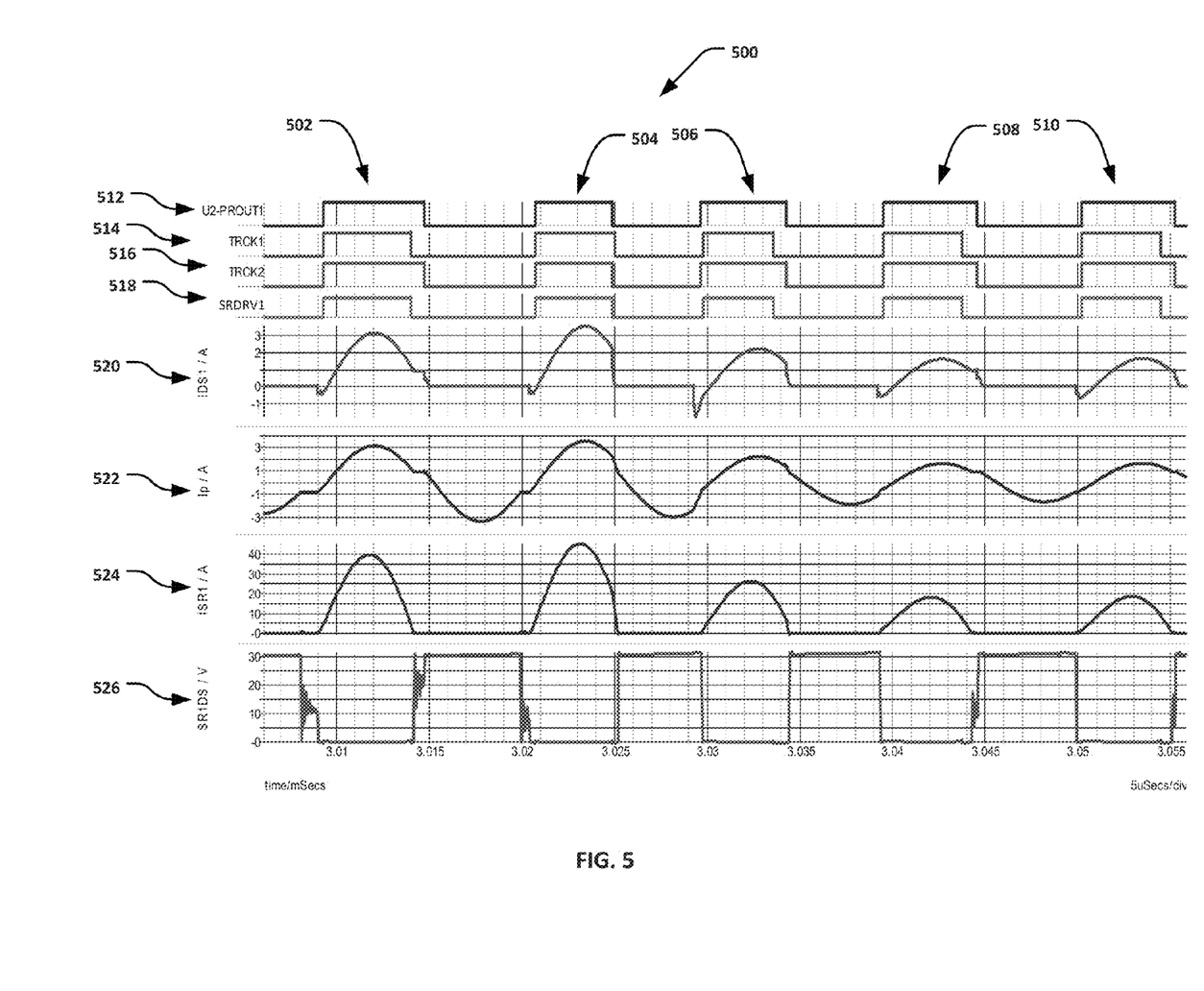
FIG. 5 illustrates example simulation waveforms of various signals for below and above resonance operation consistent with one embodiment of the present disclosure.

FIG. 5 illustrates example simulation waveforms 500 of various signals for below and above resonance operation consistent with one embodiment of the present disclosure. With continued reference to FIGS. 1 and 2, the simulation waveforms 500 illustrate various signal waveforms through a plurality of cycles 502-510. Cycles 502, 508 and 510 illustrate below resonance simulations, and cycles 504 and 506 illustrate above resonance simulations. While the simulation waveforms 500 represent the signal states of various signals associated with the operation of the Q1 and SR1 switches, it should be understood at the outset that the simulation waveforms 500 may apply equally to the operation of the Q2 and SR2 switches.

Waveform 512 illustrates the PROUT1 gate drive signal for the Q1 switch of the primary side. Waveforms 514 and 516 illustrate the TRCK1 and TRCK2 signals, respectively. Waveform 518 illustrates the SRDRV1 gate drive signal for the SR1 switch of the secondary side. Waveform 520 illustrates the current through the Q1 switch of the primary side. Waveform 522 illustrates the current of the primary side of the transformer 112. Waveform 524 illustrates the current through the SR1 switch. Waveform 526 illustrates the drain-source voltage (VSR1DS) of the SR1 switch.

The term "switches" may be embodied as MOSFET switches (e.g. individual NMOS and/or PMOS elements), BJT switches and/or other switching circuits known in the art. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit. In addition, the example embodiments described herein have used certain types of devices by convention, e.g., NMOS switches that are turned on when a gate control signal is high and turned off when a gate control signal is low. In other embodiments, active low devices may be used (e.g., PMOS devices). In such embodiments the timing and signal diagrams described herein would change to reflect the operation of an active low device, as is well-understood in the art.

According to one aspect there is provided a resonant converter system. The resonant converter system may comprise transformer circuitry including a primary side and a secondary side, first stage circuitry coupled to the primary side, the first stage circuitry including inverter circuitry having a first inverter switch, a second inverter switch and resonant tank circuitry, pulse frequency modulation (PFM) controller circuitry configured to generate a first drive signal and a second drive signal to control on and off times of the first and second inverter switches, respectively, second stage circuitry coupled to the secondary side, the second stage circuitry including synchronous rectifier (SR) circuitry having a first SR switch and a second SR switch corresponding to the first and second inverter switches, respectively and SR controller circuitry configured to generate control signals to control the on and off times of the first and second SR switches, respectively, based on at least the first and second drive signals and voltage drops across the first and second SR switches.

According to another aspect there is provided a resonant converter controller. The resonant converter controller may comprise first tracking circuitry configured to generate a first tracking signal indicative of a time duration from a rising edge of a first drive signal for controlling a conduction state of a first inverter switch of a resonant converter system to a turn off time of a first synchronous rectifier (SR) switch of the resonant converter system, wherein the first tracking signal is based on at least the first drive signal and a voltage drop across the first SR switch and second tracking circuitry configured to generate a second tracking signal indicative of a time duration from a falling edge of the first drive signal to a turn off time of the first SR switch, wherein the second tracking signal is based on at least the first drive signal and the voltage drop across the first SR switch.

According to another aspect there is provided a method for controlling the operation of a resonant converter system. The method may comprise generating first and second drive signals to control on and off times of first and second inverter switches, respectively, in a first stage of a resonant converter system, determining voltage drops across each of first and second synchronous rectifier (SR) switches in a second stage of the resonant converter system, the first and second SR switches corresponding to the first and second inverter switches, respectively and generating control signals to control on and off times of the first and second SR switches, respectively, based on at least the first and second drive signals and voltage drops across the first and second SR switches.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A resonant converter system, comprising:
    transformer circuitry including a primary side and a secondary side;
    first stage circuitry coupled to the primary side, the first stage circuitry including inverter circuitry having a first inverter switch, a second inverter switch and resonant tank circuitry having a resonant frequency f(0);
    pulse frequency modulation (PFM) controller circuitry configured to generate a first drive signal and a second drive signal to control on and off times of the first and second inverter switches, respectively, at a switching frequency f(s);
    second stage circuitry coupled to the secondary side, the second stage circuitry including synchronous rectifier (SR) circuitry having a first SR switch and a second SR switch corresponding to the first and second inverter switches, respectively; and
    SR controller circuitry configured to:
        generate control signals to control the on and off times of the first and second SR switches, respectively, based on at least the first and second drive signals and voltage drops across the first and second SR switches;
        when f(s) is less than f(0), generate the control signals to turn on each SR switch at approximately the same time as each corresponding inverter switch and turn off each SR switch prior to the turn off of each corresponding inverter switch; and
        when f(s) is greater than f(0), generate the control signals to turn on each SR switch after the turn on of each corresponding inverter switch and turn off each SR switch after the turn off of each corresponding inverter switch.

2. The resonant converter system of claim 1, wherein the SR controller circuitry is further configured to generate a first tracking signal for each SR switch, the first tracking signal having a time duration from approximately a rising edge of the drive signal of the corresponding inverter switch to an SR current zero crossing instant of the SR switch.

3. The resonant converter system of claim 2, wherein the SR controller circuitry is further configured to generate a second tracking signal for each SR switch, the second tracking signal having a time duration from approximately a falling edge of the drive signal of the corresponding inverter switch to an SR current zero crossing instant of the SR switch.

4. The resonant converter system of claim 3, wherein the SR controller circuitry is further configured to turn off each SR switch based at least on a result of a logical AND of the first and second tracking signals for each SR switch.

5. The resonant converter system of claim 1, wherein the PFM controller circuitry is further configured to generate the first and second drive signals using feedback based at least on an output voltage of the resonant converter circuitry.

6. A resonant converter controller, comprising:
    first tracking circuitry configured to generate a first tracking signal indicative of a time duration from a rising edge of a first drive signal for controlling a conduction state of a first inverter switch of a resonant converter system to a synchronous rectifier (SR) current zero crossing instant of a first SR switch of the resonant converter system, wherein the first tracking signal is based on at least the first drive signal and a voltage drop across the first SR switch; and
    second tracking circuitry configured to generate a second tracking signal indicative of a time duration from a falling edge of the first drive signal to the SR current zero crossing instant of the first SR switch, wherein the second tracking signal is based on at least the first drive signal and the voltage drop across the first SR switch.

7. The resonant converter controller of claim 6, wherein the first tracking circuitry comprises at least an analog comparator, a first edge-triggered flip-flop, a counter, a register, an inverter, a digital comparator, and a second edge-triggered flip-flop.

8. The resonant converter controller of claim 6, wherein the second tracking circuitry comprises at least an analog comparator, an edge-triggered flip-flop, a counter, a register, comparison logic circuitry, a digital comparator and a level-triggered flip-flop.

9. The resonant converter controller of claim 6, further comprising logic circuitry including at least a logical AND configured to receive the first and second tracking signals and generate a control signal for the first SR switch.

10. The resonant converter controller of claim 6, further comprising third tracking circuitry configured to generate a third tracking signal indicative of a time duration from a rising edge of a second drive signal for controlling a conduction state of a second inverter switch of the resonant converter system to an SR current zero crossing instant of a second SR switch of the resonant converter system, wherein the third tracking signal is based on at least the second drive signal and a voltage drop across the second SR switch; and
    fourth tracking circuitry configured to generate a fourth tracking signal indicative of a time duration from a falling edge of the second drive signal to an SR current zero crossing instant of the second SR switch, wherein the fourth tracking signal is based on at least the second drive signal and the voltage drop across the second SR switch.

11. A method for controlling the operation of a resonant converter system, comprising:
    generating first and second drive signals to control on and off times of first and second inverter switches, respectively, at a switching frequency f(s), wherein the first and second inverter switches are included in a first stage of the resonant converter system that further includes resonant tank circuitry having a resonant frequency f(0);
    determining voltage drops across each of first and second synchronous rectifier (SR) switches in a second stage of the resonant converter system, the first and second SR switches corresponding to the first and second inverter switches, respectively; and
    generating control signals to control on and off times of the first and second SR switches, respectively, based on at least the first and second drive signals and voltage drops across the first and second SR switches, wherein when f(s) is less than f(0) the control signals are generated to turn on each SR switch at approximately the same time as each corresponding inverter switch and turn off each SR switch prior to the turn off of each corresponding inverter switch, and when f(s) is greater than f(0) the control signals are generated to turn on each SR switch after each corresponding inverter switch and turn off each SR switch after the turn off of each corresponding inverter switch.

12. The method of claim 11, further comprising:
generating a first tracking signal for each SR switch, the first tracking signal having a time duration from approximately a rising edge of the drive signal of the corresponding inverter switch to an SR current zero crossing instant of the SR switch.

13. The method of claim 12, further comprising:
generating a second tracking signal for each SR switch, the second tracking signal having a time duration from approximately a trailing edge of the drive signal of the corresponding inverter switch to an SR current zero crossing instant of the SR switch.

14. The method of claim 13, further comprising:
turning off each SR switch based at least on a result of a logical AND of the first and second tracking signals for each SR switch.

\* \* \* \* \*